(12) United States Patent
Kongkanand et al.

(10) Patent No.: US 9,947,935 B1
(45) Date of Patent: Apr. 17, 2018

(54) FACILE CONTROL OF PORE STRUCTURE IN CARBON-SUPPORTED PGM-BASED CATALYSTS

(71) Applicant: GM GLOBAL TECHNOLOGY OPERATIONS LLC, Detroit, MI (US)

(72) Inventors: Anusorn Kongkanand, Rochester Hills, MI (US); Michael K. Carpenter, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 41 days.

(21) Appl. No.: 15/282,080

(22) Filed: Sep. 30, 2016

(51) Int. Cl.
| | |
|---|---|
| B01J 21/18 | (2006.01) |
| B01J 23/40 | (2006.01) |
| B01J 37/12 | (2006.01) |
| B01J 37/14 | (2006.01) |
| B01J 37/18 | (2006.01) |
| H01M 4/88 | (2006.01) |
| H01M 4/92 | (2006.01) |
| H01M 4/90 | (2006.01) |

(52) U.S. Cl.
CPC ....... H01M 4/8882 (2013.01); H01M 4/8878 (2013.01); H01M 4/9083 (2013.01); H01M 4/926 (2013.01)

(58) Field of Classification Search
CPC ........ B01J 21/18; B01J 23/40; B01J 35/1061; B01J 35/1066; B01J 35/109; B01J 37/12; B01J 37/14; B01J 37/18; B01J 37/0018; H01M 4/8882; H01M 4/8878; H01M 4/9083; H01M 4/926
USPC ....... 502/185, 27, 38; 423/449.3, 449.5, 460
See application file for complete search history.

(56) References Cited

U.S. PATENT DOCUMENTS

| | | | | |
|---|---|---|---|---|
| 4,066,699 A | * | 1/1978 | Suggitt | B01J 23/44 423/461 |
| 4,122,671 A | * | 10/1978 | Armstrong | B01J 23/468 149/36 |
| 4,185,082 A | * | 1/1980 | Sinha | B01D 53/62 423/213.2 |
| 4,379,077 A | * | 4/1983 | Solomon | C25B 11/04 502/101 |
| 4,532,227 A | * | 7/1985 | Suggitt | B01J 21/18 502/180 |

(Continued)

FOREIGN PATENT DOCUMENTS

KR   20140005723 A  *  1/2014   ............. B01J 23/42

OTHER PUBLICATIONS

Restriction Requirement dated Oct. 4, 2016 for U.S. Appl. No. 14/815,450, 7 pgs.
Non-final Office Action dated Dec. 22, 2016 for U.S. Appl. No. 14/815,450, 6 pgs.

(Continued)

*Primary Examiner* — Patricia L. Hailey (57) ABSTRACT

A method for forming a carbon supported catalyst includes a step of providing a first carbon supported catalyst having a platinum-group metal supported on a first carbon support. Characteristically, the first carbon support has a first average micropore diameter and a first average carbon surface area. The first carbon supported catalyst is contacted with an oxygen-containing gas at a temperature less than about 450° C. for a predetermined period of time to form a second carbon supported catalyst, wherein the first carbon support or the second carbon supported catalyst is acid leached.

19 Claims, 8 Drawing Sheets

(56) References Cited

U.S. PATENT DOCUMENTS

| | | | | |
|---|---|---|---|---|
| 4,609,636 A * | 9/1986 | Mabry | ............... | B01J 23/6567 |
| | | | | 502/183 |
| 4,756,898 A * | 7/1988 | Hopper | ................. | B01J 21/18 |
| | | | | 264/29.1 |
| 5,061,671 A * | 10/1991 | Kitson | ................ | C07C 29/149 |
| | | | | 502/185 |
| 5,624,547 A | 4/1997 | Sudhakar et al. | | |
| 5,876,867 A * | 3/1999 | Itoh | ..................... | B01J 23/56 |
| | | | | 204/290.14 |
| 6,573,212 B2 * | 6/2003 | McCrae | ................ | B01J 20/20 |
| | | | | 423/447.1 |
| 2004/0248730 A1 | 12/2004 | Kim et al. | | |
| 2006/0073966 A1 * | 4/2006 | Kourtakis | ............... | B01J 21/18 |
| | | | | 502/185 |
| 2010/0099551 A1 | 4/2010 | Yuge et al. | | |
| 2011/0039184 A1 * | 2/2011 | Chang | .................. | B01J 21/18 |
| | | | | 429/485 |
| 2013/0023406 A1 * | 1/2013 | Wan | ................... | C07F 9/3813 |
| | | | | 502/184 |
| 2013/0085061 A1 * | 4/2013 | Stamenkovic | ......... | H01M 4/921 |
| | | | | 502/185 |
| 2014/0178575 A1 * | 6/2014 | Iio | ........................ | H01M 4/92 |
| | | | | 427/115 |

OTHER PUBLICATIONS

Final Office Action dated Apr. 18, 2017 for U.S. Appl. No. 14/815,450, 11 pgs.

Restriction Requirement dated Oct. 26, 2017 for U.S. Appl. No. 14/815,450, 7 pgs.

\* cited by examiner

FACILE CONTROL OF PORE STRUCTURE IN CARBON-SUPPORTED PGM-BASED CATALYSTS

TECHNICAL FIELD

In at least one aspect, the present invention relates to catalyst materials for fuel cells with improved performance.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

High surface area carbon black is often used as a support for fuel cell catalysts. High surface area carbon black often contains large quantities of internal micropores (<4 nm) in their constituent particles. Pt nanoparticles deposited in these micropores can have restricted access to reactants and show poor activity. Studies have shown that up to 80% of all Pt particles are deposited inside the micropores. Opening up these micropores to better expose the Pt particles should improve the high power performance of the catalyst. As used herein, the terms "micropores" and "pores" are used interchangeably, not to be mistaken with mesopores (pores of 5-15 nm) and macropores (pores >15 nm).

Catalyst durability, particularly as it relates to the retention of high power performance, is one of the major challenges facing the development of automotive fuel cell technology. Platinum or platinum-alloy particles lose electrochemical surface area during operation due to dissolution and subsequent Ostwald ripening and to particle migration and coalescence. Electrochemical oxidation of the carbon support enhances this particle migration and subsequent performance loss at high power. Oxidation of carbon support also causes the collapse of the electrode thickness and electrode porosity, hindering reactant transport and subsequent performance loss. Therefore, it is a common practice for those skilled in the art to avoid oxidation of carbon support.

On the other hand, in electrodes with small amount of Pt or low Pt surface area, large fuel cell performance loss is observed. This is due to the need to support larger flux of reactant oxygen or hydrogen to the Pt surface. This is particularly difficult for Pt particles that are embedded in carbon particle micropores. Accordingly, there is a need for improved catalyst layers.

SUMMARY

The present invention solves one or more problems of the prior art by providing, in at least one embodiment, a method for forming a carbon supported catalyst. The method includes a step of providing a first carbon supported catalyst having a platinum-group metal supported on a first carbon support. Characteristically, the first carbon support has a first average micropore diameter and a first average carbon surface area. The first carbon supported catalyst is contacted with an oxygen-containing gas at a temperature less than about 450° C. for a predetermined period of time to form a second carbon supported catalyst, wherein the first carbon support or the second carbon supported catalyst is acid leached.

A method for forming a carbon supported catalyst is provided. The method includes a step of providing a first carbon supported catalyst having a platinum-group metal supported on a first carbon support. Characteristically, the first carbon support has a first average micropore diameter and a first average carbon surface area. The first carbon supported catalyst is contacted with an oxygen-containing gas at a temperature less than about 450° C. for a predetermined period of time to form a second carbon supported catalyst. The second carbon supported is subsequently contacted with molecular hydrogen to form a third carbon supported catalyst. The third carbon supported catalyst is acid leached to form a fourth carbon supported catalyst having depleted non-noble metal catalyst particles disposed on a carbon support.

DETAILED DESCRIPTION

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Abbreviations:

"BET" means Brunauer-Emmett-Teller (BET) theory;
"BOL" means beginning of life;
"PGM" means platinum group metal.

Figure 1:
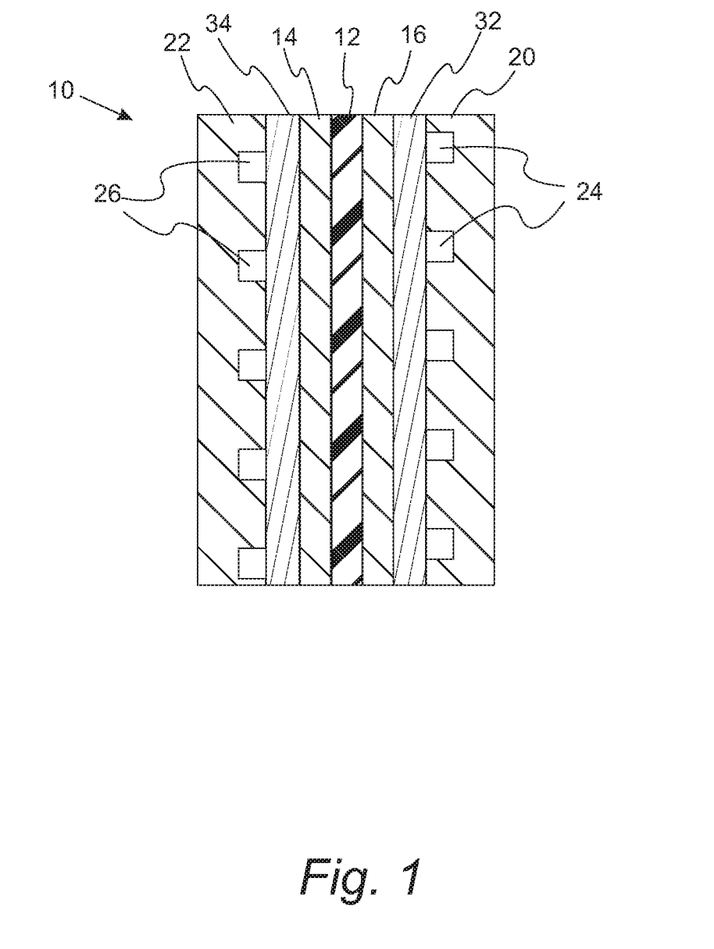
FIG. 1 is a schematic cross section of a fuel cell that incorporates carbon supported catalysts into the anode and/or cathode catalyst layers.

With reference to FIG. 1, a cross sectional view of a fuel cell incorporating the platinum group metal-containing carbon supported catalysts is provided. PEM fuel cell 10 includes polymeric ion conducting membrane 12 disposed between cathode electro-catalyst layer 14 and anode electro-catalyst layer 16. Fuel cell 10 also includes electrically conductive flow field plates 20, 22 which include gas channels 24 and 26. Flow field plates 20, 22 are either bipolar plates (illustrated) or unipolar plates (i.e., end plates). In a refinement, flow field plates 20, 22 are formed from a metal plate (e.g., stainless steel) optionally coated with a precious metal such as gold or platinum. In another refinement, flow field plates 20, 22 are formed from conducting polymers which also are optionally coated with a precious metal. Gas diffusion layers 32 and 34 are also interposed between flow field plates and a catalyst layer. Cathode electro-catalyst layer 14 and anode electro-catalyst layer 16 include carbon supported catalysts made by the processes set forth below. Advantageously, the carbon supported catalysts have improved activity and stability anode and cathode electro-catalyst layers.

Figure 2:
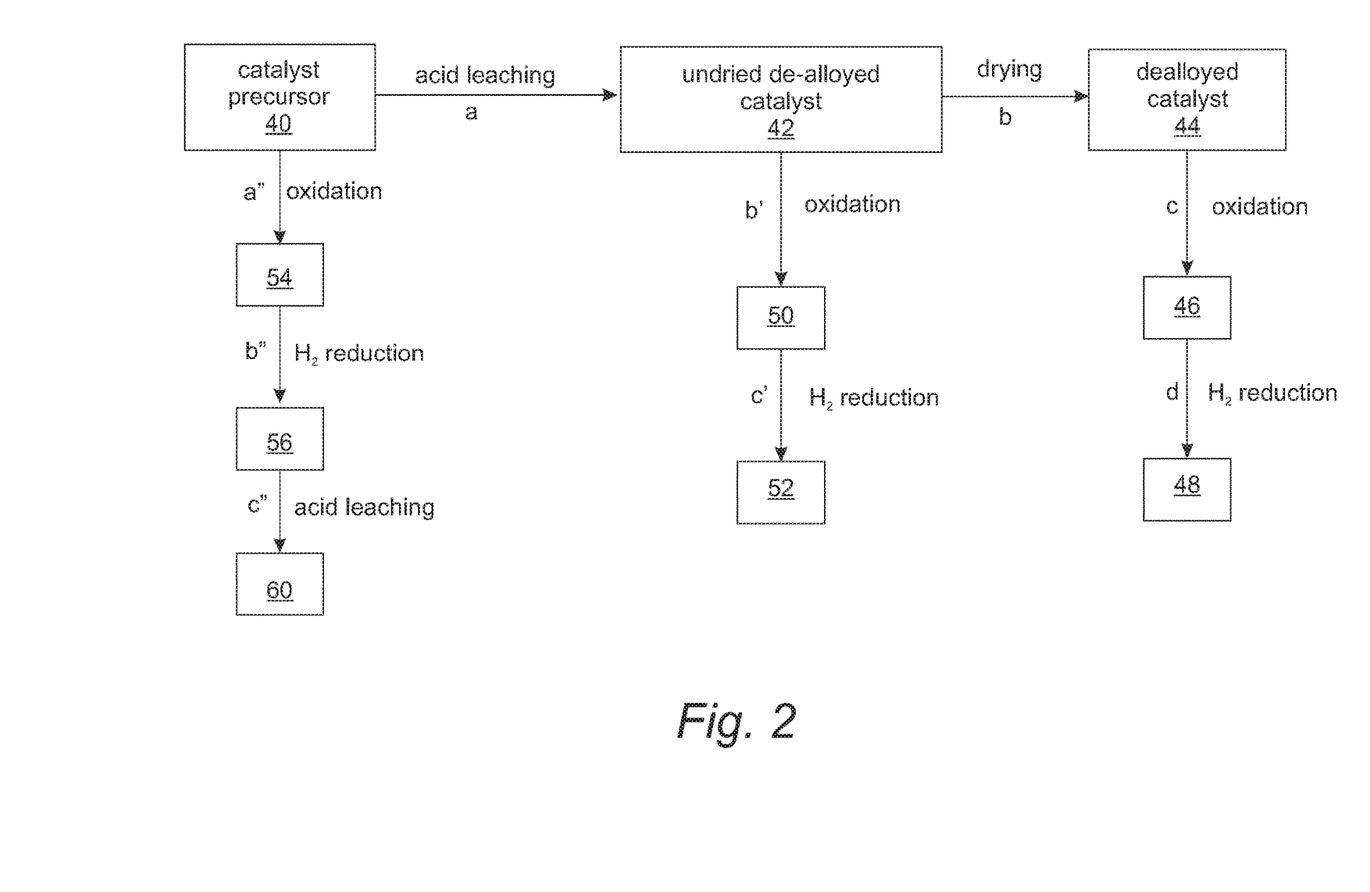
FIG. 2 is a schematic flow chart illustrating several variations of a method of forming a carbon supported catalyst.

With reference to FIG. 2, a schematic flow chart illustrating several variations of a method of forming a carbon supported catalyst is provided. In a first variation, catalyst precursor 40 (i.e., a first carbon supported catalyst) is subjected to acid leaching to form an undried de-alloyed catalyst 42 is step a. In one refinement, in step b) undried de-alloyed catalyst 42 is dried to form de-alloyed catalyst 44. De-alloyed catalyst 44 is then contacted with an oxygen-containing gas in step c) to form modified carbon supported catalyst 46. Finally, in step d) modified carbon supported catalyst 46 is then contacted with molecular hydrogen to form final carbon supported catalyst 48.

Still referring to FIG. 2, undried de-alloyed catalyst 42 is contacted with an oxygen-containing gas to form modified carbon supported catalyst 50 in step b'. In step c'), modified carbon supported catalyst 50 is then contacted with molecular hydrogen to form final carbon supported catalyst 52.

Still referring to FIG. 2, catalyst precursor 40 is contacted with an oxygen-containing gas to form modified carbon supported catalyst 54 in step a"). Modified carbon supported catalyst 54 is then contacted in step b") with molecular hydrogen to form carbon supported catalyst 56. Finally, in step c", carbon supported catalyst 56 is then acid leached to form final carbon supported catalyst 60.

In each of the variations of the method set forth above, catalyst precursor 40 includes a platinum-group metal. In particular, the platinum-group metal is selected from the group consisting of Pt, Pd, Au, Ru, Ir, Rh, and Os. In this regard, Pt is found to be particularly useful. In one variation, the carbon supported catalyst includes a carbon support and a platinum-group metal (PGM) disposed over/supported on the carbon support. In a refinement, the platinum-group metal is supported on carbon at a loading from about 5 weight percent to about 50 weight percent. The carbon supported catalyst is characterized by a multiscale pore diameters: with micropore and mesopore size of less than 100 angstroms and with macropore size of greater than 100 angstroms. The carbon supported catalyst is also characterized by its average surface area which is greater than 500 m$^2$/g. In a refinement, the average carbon surface area is greater than, in increasing order of preference, 500 m$^2$/g, 600 m$^2$/g, 700 m$^2$/g, or 800 m$^2$/g. In another refinement, the average carbon surface area is less than, in increasing order of preference, 3000 m$^2$/g, 2000 m$^2$/g, or 1000 m$^2$/g. In a refinement, the carbon supported catalyst has an average pore volume that is less than about 0.6 cm$^3$/g. In another refinement, the average pore volume is less than, in increasing order of preference, 1.1 cm$^3$/g, 1.0 cm$^3$/g, and 0.9 cm$^3$/g. In still another refinement, the average pore volume is greater than, in increasing order of preference, 0.2 cm$^3$/g, 0.3 cm$^3$/g, 0.4 cm$^3$/g, or 0.5 cm$^3$/g. In a variation, the pore volume, pore diameter and surface area are determined by a BET method.

In a refinement, the catalyst precursor 40 includes an alloy that includes the platinum group metal and one or more additional metals. In a refinement, the one or more additional metals include first or second row transition metals. Specific examples of the one or more additional metals include Co, Ni, Fe, Ti, Sc, Cu, Mn, Cr, V, Ru, Zr, Y and W. Typically, the carbon support is a carbon powder having a plurality of carbon particles. The carbon particles may have any number of shapes without limiting the invention in any way. Examples of such shapes include, but are not limited to, nano-rods, nanotubes, nano-rafts, non-electrically conducting particles, spherical particles, and the like. In one variation, the carbon particles are a carbon powder and in particular, a high surface area carbon (HSC) powder typically having an average spatial dimension (e.g., diameter) from about 5 to 500 nanometers. In a refinement, the carbon powder has an average spatial dimension from about 10 to 300 nanometers. In another refinement, carbon black having an average spatial dimension from about 30 to 300 nanometers is used for the carbon particles. A particularly useful example of carbon black is Ketjen Black.

The catalyst precursor 40 has a first average pore volume, a first average pore diameter, and a first average surface area. In a refinement, the first average micropore diameter is less than 70 angstroms, and the first average carbon surface area is greater than 500 m$^2$/g. In a refinement, the first average pore diameter is less than, in increasing order of preference 100 angstroms, 80 angstroms, 70 angstroms and 50 angstroms and greater than in increasing order of preference, 10 angstroms, 20 angstroms, 30 angstroms, and 40 angstroms. In another refinement, the first average carbon surface area is greater than, in increasing order of preference, 400 m$^2$/g, 500 m$^2$/g, 600 m$^2$/g, and 700 m$^2$/g and less than, in increasing order of preference, 1200 m$^2$/g, 1000 m$^2$/g, 800 m$^2$/g, and 600 m$^2$/g. Typically, the first average pore volume is greater than 0.6 cm$^3$/g. In another refinement, the first average pore volume is greater than, in increasing order of preference, 0.5 cm$^3$/g, 0.6 cm$^3$/g, 0.7 cm$^3$/g, and 0.8 cm$^3$/g. In still another refinement, the first average pore volume is less than, in increasing order of preference, 1.5 cm$^3$/g, 1.2 cm$^3$/g, 1.0 cm$^3$/g, or 0.9 cm$^3$/g.

In each of the method variations set forth above, the pore size of the final carbon supported catalyst that is formed has a pore size that is greater than that of catalyst precursor 40. In particular, each of the carbon supported catalysts formed after the step of contact with an oxygen-containing gas have a larger pore size than catalyst precursor 40. In each case, this larger pore size is characterized by a second average pore volume, a second average pore diameter, and a second average surface area. Characteristically, the second average pore diameter is greater than the first average pore diameter and the second average surface area is less than the first average surface area. In a refinement, the second average micro and mesopore volume is greater than the first average pore volume. Details for the second average pore volume, second average pore diameter, and the second average surface area are set forth above. The second average micropore diameter is typically greater than 50 angstroms. In a refinement, the second average pore diameter is greater than, in increasing order of preference, 40 angstroms, 50 angstroms, 55 angstroms, 60 angstroms, or 70 angstroms. In another refinement, the second average pore diameter is less than, in increasing order of preference, 150 angstroms, 120 angstroms, 100 angstroms, or 90 angstroms. Typically, the second average carbon surface area is less than 800 m$^2$/g. In a refinement, the second average carbon surface area is less than, in increasing order of preference, 1100 m$^2$/g, 1000 m$^2$/g, 900 m$^2$/g, or 750 m$^2$/g. In another refinement, the second average carbon surface area is greater than, in increasing order of preference, 300 m$^2$/g, 400 m$^2$/g, 500 m$^2$/g, or 650 m$^2$/g.

As set forth above, the variations of the method for forming a carbon supported catalyst includes an acid leaching step. Typically, leaching is accomplished by contacting the carbon supported catalyst (e.g., catalyst precursor 40 or carbon supported catalyst 56) with an aqueous acid. For example, the carbon supported catalyst being acid leach can be contacted with a 1M nitric acid solution for 24 hours at 70° C.

Each of the methods set forth above includes a step in which a carbon supported catalyst is contacted with an oxygen-containing gas. Examples of oxygen-containing gas include air, pure oxygen, or gaseous mixtures including 1 to 99 percent oxygen and a carrier gas (e.g., N$_2$, Argon, etc.). In a refinement, the oxygen-containing gas includes from 0.1 to 100 weight percent molecular oxygen. In another refinement, the oxygen-containing gas includes from 1 to 30 weight percent molecular oxygen. As set forth above, various carbon supported catalysts are contacted with the oxygen-containing gas at a temperature less than about 450° C. for a predetermined period of time to form a second carbon supported catalyst. In other refinements, the first carbon supported catalyst is contacted with an oxygen-containing gas at a temperature less than about 300° C. for a predetermined period of time to form a second carbon supported catalyst. In other refinements, the first carbon supported catalyst is contacted with an oxygen-containing gas at a temperature less than about from 150 to 350° C. for a predetermined period of time to form a second carbon supported catalyst. In still other refinements, the first carbon supported catalyst is contacted with an oxygen-containing gas at a temperature less than about from 200 to 300° C. for a predetermined period of time to form a second carbon supported catalyst. In another variation, the first carbon supported catalyst is contacted with an oxygen-containing gas at a temperature less than or equal to, in increasing order of preference, 450° C., 300° C., 250° C., 200° C., 180° C., or 150° C., and at a temperature greater than or equal to 50° C., 75° C., 90° C., 100° C., or 120° C. The oxidation of the first carbon supported catalyst typically is performed at around 1 atm. In each case, the predetermined time can be from 1 minutes to 24 hours depending on the pore sizes that are desired, the type of carbon, and the temperature at which the carbon supported catalyst is contacted with the oxygen-containing gas. At high temperatures from about 350 to 450° C., the predetermined time can be from 1 second to 2 minutes. At temperatures from about 200 to 300° C., the predetermined time can be from 1 minute to 24 hours. When a carbon supported PGM catalyst is heated in an oxidizing environment, the platinum group metal catalyst particles serve as oxidation catalyst sites that allow localized corrosion of the micropores in which they reside, resulting in larger pores and improved transport properties. The mild oxidation also preferentially removes some of the less stable amorphous carbon, partially stabilizing the support and thus improving catalyst durability. In a refinement, the average pore diameter of the carbon supported catalyst that is contacted with the oxygen-containing gas is greater than the first average pore diameter and the average surface area of the carbon supported catalyst that is contacted with the oxygen-containing gas is less than the first average surface area.

In another embodiment, the carbon supported catalysts set forth above are used in an ink composition to form fuel cell catalyst layers by methods known to those skilled in fuel cell technology. In a refinement, the ink composition includes the carbon supported catalysts in an amount of about 1 weight percent to 10 weight percent of the total weight of the ink composition. In a refinement, the ink composition includes ionomers (e.g., a perfluorosulfonic acid polymer such as NAFION®) in an amount from about 5 weight percent to about 40 weight percent of the catalyst composition. Typically, the balance of the ink composition is solvent. Useful solvents include, but are not limited to, alcohols (e.g., propanol, ethanol, and methanol), water, or a mixture of water and alcohols. Characteristically, the solvents evaporate at room temperature.

The following examples illustrate the various embodiments of the present invention. Those skilled in the art will recognize many variations that are within the spirit of the present invention and scope of the claims.

Figure 3A:
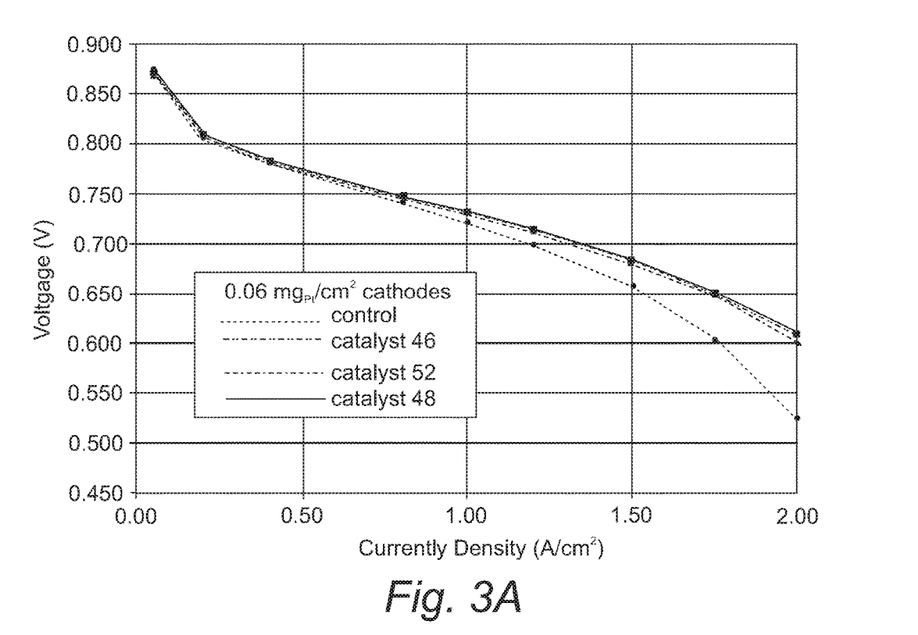
FIG. 3A provides plots of fuel cell voltage versus current density for variously modified carbon supported catalysts (modified carbon supported catalyst 46, final carbon supported catalyst 48, and final carbon supported catalyst 52) that have been acid leached before treatment with oxygen and hydrogen.
Figure 3B:
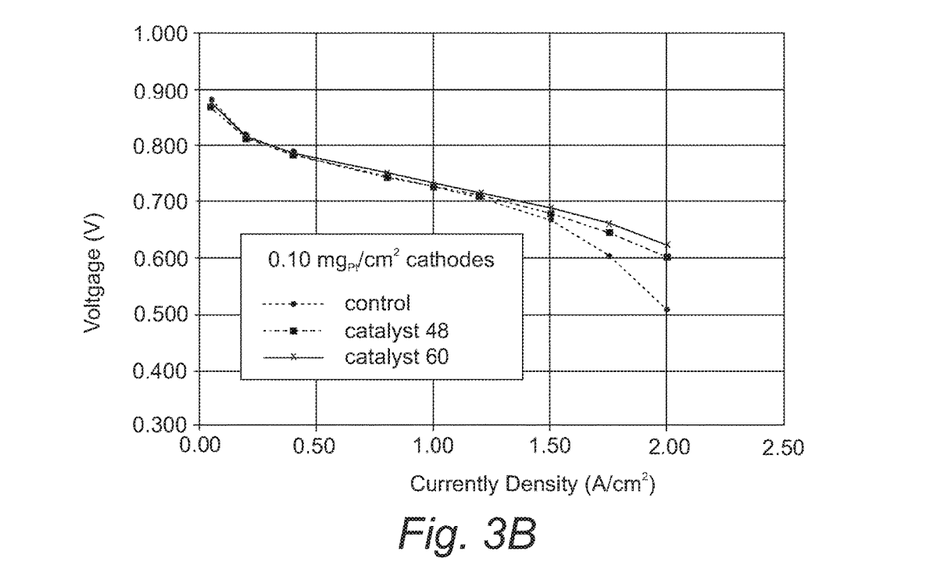
FIG. 3B provides plots of fuel cell voltage versus current density for variously modified carbon supported catalysts (final carbon supported catalyst 48 and final carbon supported catalyst 60) that have been acid leached after treatment with oxygen and hydrogen.

FIGS. 3A and 3B provide plots of fuel cell voltage versus current density for variously modified carbon supported catalysts. FIG. 3A compares the fuel cell polarization curves for modified carbon supported catalyst 46, final carbon supported catalyst 48, and final carbon supported catalyst 52 from FIG. 2. FIG. 3B compares the fuel cell polarization curves between catalysts treated before and after the acid leaching step for final carbon supported catalyst 48 compared to final carbon supported catalyst 60 from FIG. 2. Both catalysts final carbon supported catalyst 48 and final carbon supported catalyst 60 gave comparable performance.

Figure 4A:
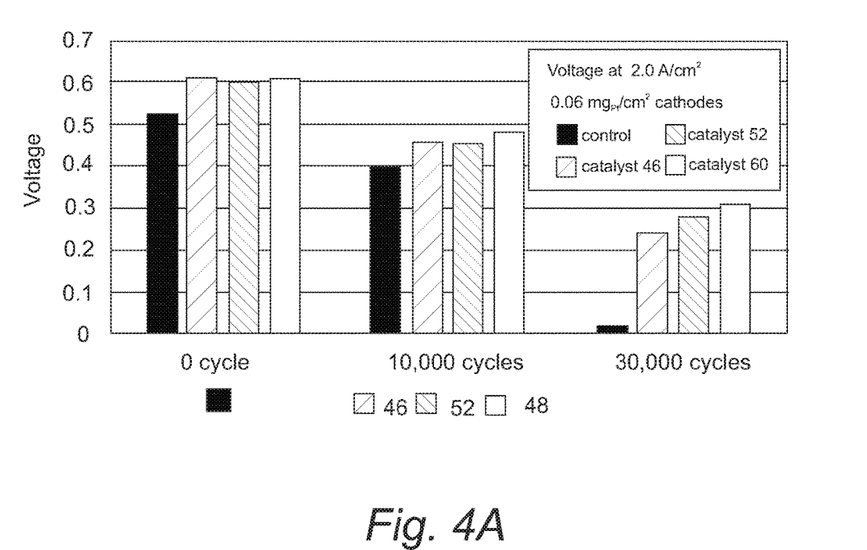
FIG. 4A provides plots of fuel cell voltage versus the number of cycles for variously modified carbon supported catalysts (modified carbon supported catalyst 46, final carbon supported catalyst 48, and final carbon supported catalyst 52) that have been acid leached before treatment with oxygen and hydrogen.
Figure 4B:
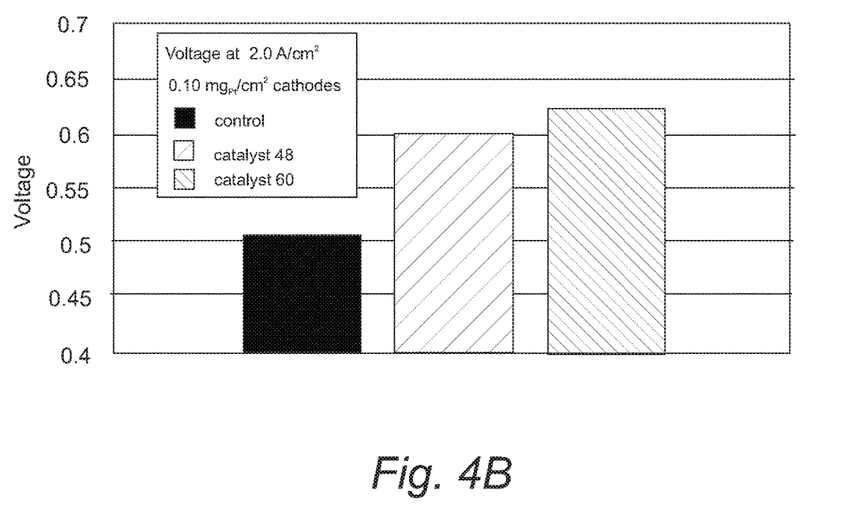
FIG. 4B provides plots of fuel cell voltage for variously modified carbon supported catalysts (final carbon supported catalyst 48 and final carbon supported catalyst 60) that have been acid leached after treatment with oxygen and hydrogen.

FIGS. 4A and 4B provide plots of fuel cell voltage versus the number of cycles for variously modified carbon supported catalysts. FIG. 4A shows the fuel cell performance at 2 A/cm$^2$ under HighP-wet protocol for cathodes with 0.06 mg Pt/cm$^2$ loadings before and after voltage-cycling accelerated stability tests (AST) (0.6-1.0 V) for modified carbon supported catalyst 46, final carbon supported catalyst 48, and final carbon supported catalyst 52 from FIG. 2. FIG. 4B compares shows the fuel cell performance for final carbon supported catalyst 48 compared to final carbon supported catalyst 60 from FIG. 2. All oxidized catalysts showed about 80 mV higher performance compared to the baseline at the beginning of life (BOL). It was found that Catalyst 48 gave best performance at BOL, and that gap maintains throughout the AST, indicating the advantages of the drying and H2 reduction steps.

Figure 5:
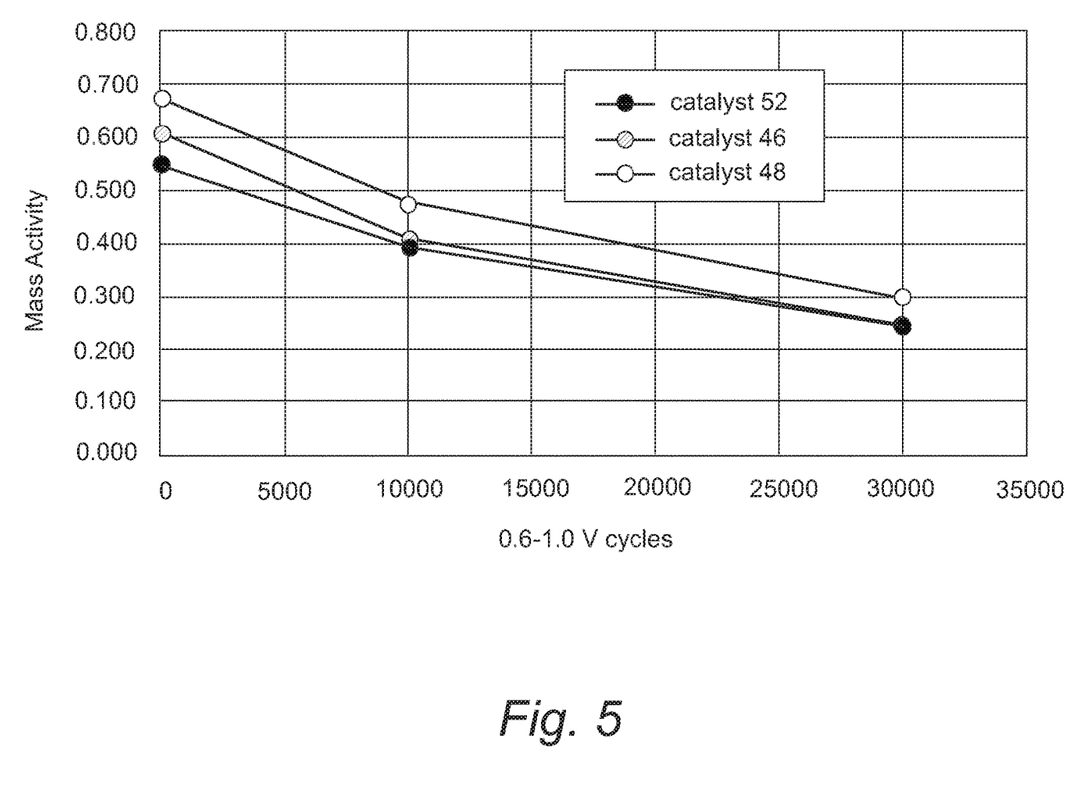
FIG. 5 is a plot of mass activity versus the number of cycles for modified carbon supported catalyst 46, final carbon supported catalyst 48, and final carbon supported catalyst 52.
Figure 6:
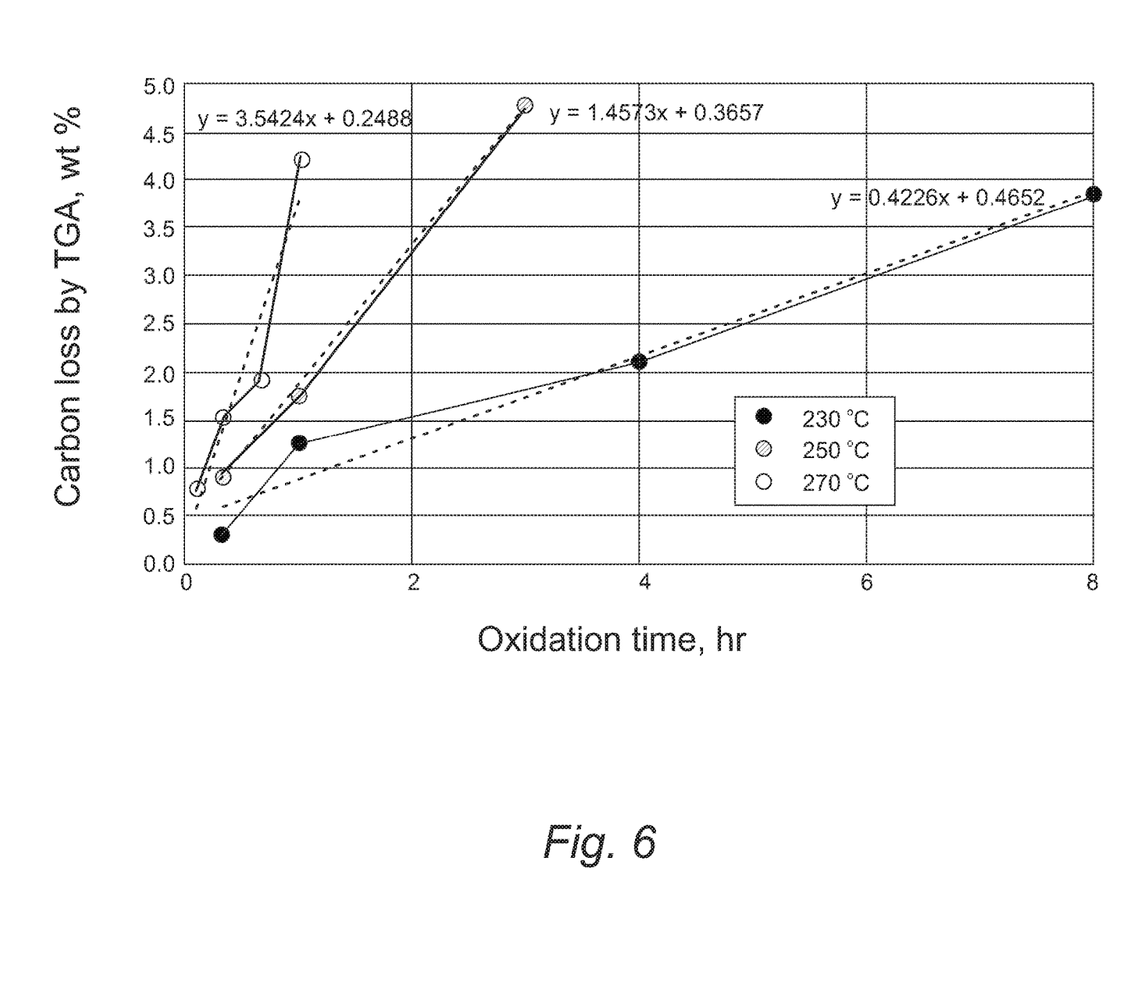
FIG. 6 is a plot of oxidation temperature and time for various modified carbon supported catalysts.
Figure 7:
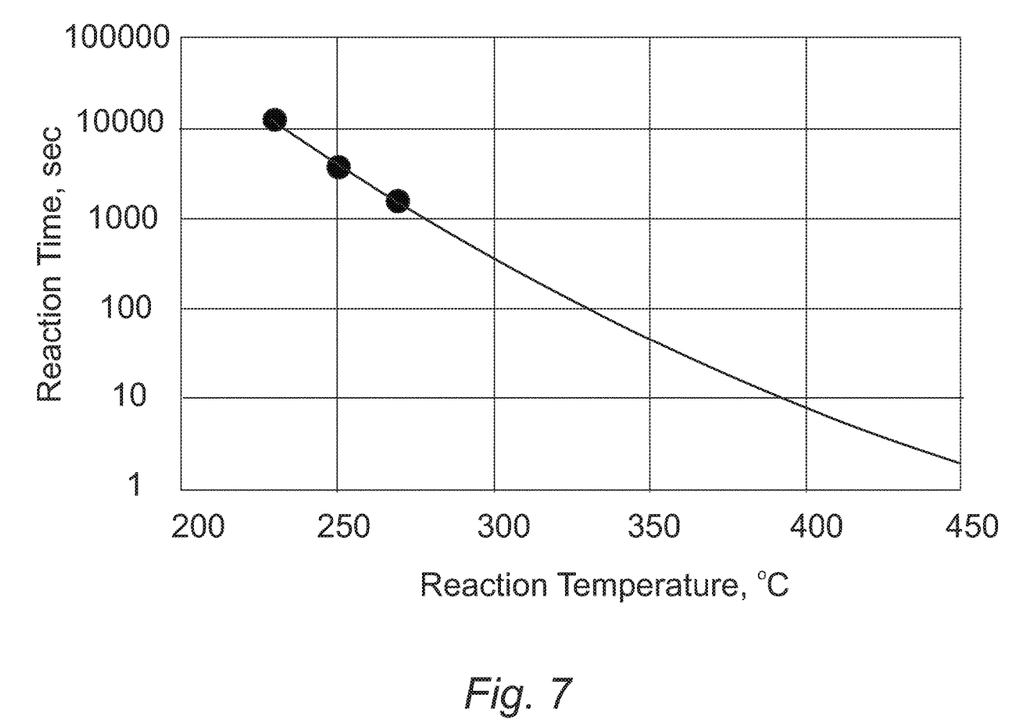
FIG. 7 is a plot of reaction time needed to achieve desired carbon loss and pore opening effect for a given reaction temperature.

FIG. 5 is a plot of mass activity versus the number of cycles for 46, 48, and 52. The oxygen reduction activity shown in FIG. 5 confirms the advantages of the drying and H$_2$ reduction steps. FIG. 6 is a plot of oxidation time for various modified carbon supported catalysts. FIG. 6 shows the carbon losses as a function of oxidation time at three different temperatures. Because the reaction was done in excess of reactant oxygen, the linearly proportional of carbon loss to the oxidation time indicates a kinetic-controlled reaction. At higher temperature, less time is needed to achieve the target carbon loss, e.g. the target micropore size. The carbon oxidation kinetic was found to follow the Arrhenius relationship. An activation energy of 121 kJ/mol was determined for this HSC carbon. The carbon oxidation kinetic can be used to estimate the reaction time needed to achieve target carbon loss at a reaction temperature. FIG. 7 is a plot of reaction time versus reaction time for the reaction of carbon supports with oxygen. FIG. 7 also compares the experimental results (circles) to the model (solid line). This data suggests that the temperature can be raised to even further to shorten the reaction time and reduce process cost.

Figure 8A:
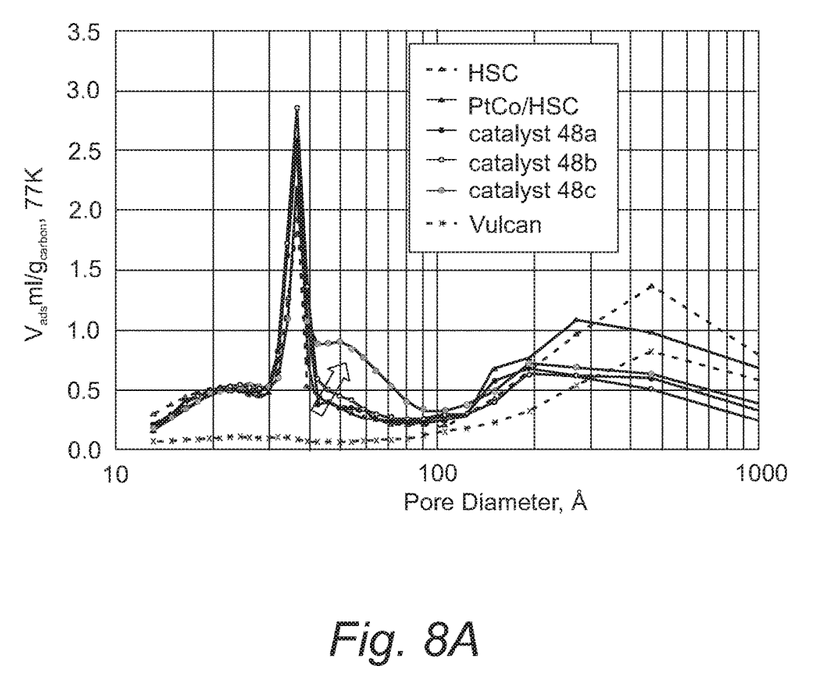
FIG. 8A is a plot of the volume per gram of carbon support of adsorbed gas versus pore size.
Figure 8B:
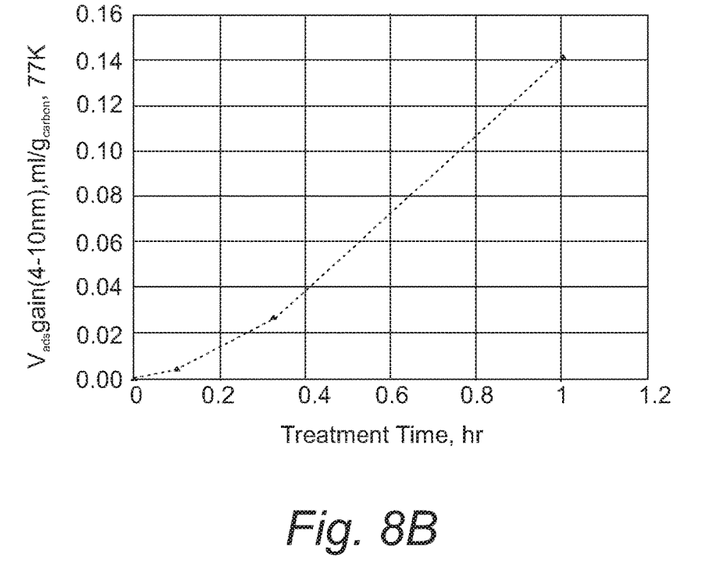
FIG. 8B is a plot of the volume of adsorbed gas versus treatment time of the carbon supported catalyst with oxygen.

FIGS. 8A-B presents gas adsorption data. FIG. 8A is a plot of the volume per gram of carbon support of adsorbed gas versus pore size while FIG. 8B is a plot of the volume of adsorbed gas versus treatment time of the carbon supported catalyst with oxygen. This is a comparison of a control first catalyst 44 with final catalysts 48 treated for different treatment times with oxygen (48a, 48b, and 48c). The gas adsorption analysis shows that there are small amount of carbon mass and surface area losses. Moreover, increasing micropore size suggests improved local oxygen transport. Table 1 provides a summary of the results:

TABLE 1

| | Adsorption Properties | | | |
| Sample | BET surface area (mm$^2$/g) | Carbon surface area (mm$^2$/g$_{carbon}$) | Carbon wt. loss (%) | Carbon area loss (%) |
| --- | --- | --- | --- | --- |
| untreated | 510 | 710 | | |
| 48a | 501 | 704 | 0.8 | 0.9 |
| 48b | 488 | 691 | 1.5 | 2.7 |
| 48c | 452 | 660 | 4.2 | 7.1 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for forming a carbon supported catalyst, the method comprising:
   a) providing a first carbon supported catalyst having a platinum-group metal supported on a first carbon support, the first carbon support having a first average pore diameter and a first average surface area;
   b) contacting the first carbon supported catalyst with an oxygen-containing gas at a temperature less than about 450° C. for a predetermined period of time to form a second carbon supported catalyst, wherein the first carbon support or the second carbon supported catalyst is acid leached.

2. The method of claim 1 wherein the first carbon support is acid leached and then contacted with the oxygen-containing gas at a temperature less than about 300° C. to form the second carbon supported catalyst.

3. The method of claim 2 wherein the first carbon supported catalyst is dried prior to being contacted with the oxygen-containing gas.

4. The method of claim 3 further comprising contacting the second carbon supported catalyst with molecular hydrogen.

5. The method of claim 1 wherein the first carbon support is contacted with the oxygen-containing gas and then acid leached to form the second carbon supported catalyst.

6. The method of claim 5 further comprising contacting the second carbon supported with molecular hydrogen.

7. The method of claim 1 wherein the second carbon supported catalyst includes an altered carbon support having a second average pore diameter and a second average carbon surface area, the second average micropore diameter being greater than the first average micropore diameter and the second average carbon surface area being less than the first average carbon surface area.

8. The method of claim 7 wherein the first average micropore diameter is less than 40 angstroms.

9. The method of claim 7 wherein the second average micropore diameter is greater than 40 angstroms.

10. The carbon supported catalyst of claim 7 wherein the second average carbon surface area is decreased by more than 2% and a second average carbon amount is decreased by more than 1%.

11. The method of claim 7 wherein the first carbon support has a first average pore volume and the altered carbon support has a second average pore volume for pore size in a range of 40-100 angstroms, the second average pore volume being greater than the first average pore volume.

12. The method of claim 1 wherein the platinum-group metal is selected from the group consisting of Pt, Pd, Au, Ru, Ir, Rh, and Os.

13. The method of claim 1 wherein the platinum-group metal is Pt.

14. The method of claim 1 wherein the first carbon support is a carbon powder.

15. A method for forming a carbon supported catalyst, the method comprising:
   a) providing a first carbon supported catalyst having a platinum-group metal supported on a first carbon support, the first carbon support having a first average micropore diameter and a first average carbon surface area;
   b) contacting the first carbon supported catalyst with an oxygen-containing gas at a temperature less than about 450° C. for a predetermined period of time to form a second carbon supported catalyst;
   c) contacting the second carbon supported with molecular hydrogen to form a third carbon supported catalyst; and
   d) acid leaching the third carbon supported catalyst to form a fourth carbon supported catalyst having depleted non-noble metal catalyst particles disposed thereon.

16. The method of claim 15 wherein the carbon supported catalyst is dried prior to being contacted with the oxygen-containing gas.

17. The method of claim 15 wherein the second carbon supported catalyst includes an altered carbon support having a second average micropore diameter and a second average carbon surface area, the second average micropore diameter being greater than the first average micropore diameter and the second average carbon surface area being less than the first average carbon surface area.

18. The method of claim 15 wherein the platinum-group metal is selected from the group consisting of Pt, Pd, Au, Ru, Ir, Rh, and Os.

19. The method of claim 15 wherein the platinum-group metal is Pt.

* * * * *